United States Patent
Araki

(10) Patent No.: US 10,789,107 B2
(45) Date of Patent: Sep. 29, 2020

(54) INFORMATION PROCESSING DEVICE, INFORMATION PROCESSING SYSTEM, AND INFORMATION PROCESSING METHOD

(71) Applicant: Ryoji Araki, Fukuoka (JP)

(72) Inventor: Ryoji Araki, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 13 days.

(21) Appl. No.: 16/040,032

(22) Filed: Jul. 19, 2018

(65) Prior Publication Data

US 2019/0079808 A1    Mar. 14, 2019

(30) Foreign Application Priority Data

Sep. 14, 2017 (JP) ................. 2017-176524

(51) Int. Cl.
| | |
|---|---|
| G06F 9/54 | (2006.01) |
| G06F 9/451 | (2018.01) |
| G06F 21/44 | (2013.01) |
| H04N 1/00 | (2006.01) |
| G06F 21/60 | (2013.01) |
| G06F 21/31 | (2013.01) |
| G06F 9/445 | (2018.01) |

(52) U.S. Cl.
CPC .......... *G06F 9/541* (2013.01); *G06F 9/44526* (2013.01); *G06F 9/451* (2018.02); *G06F 21/31* (2013.01); *G06F 21/44* (2013.01); *G06F 21/608* (2013.01); *H04N 1/00474* (2013.01); *H04N 2201/0036* (2013.01); *H04N 2201/0094* (2013.01)

(58) Field of Classification Search
None
See application file for complete search history.

(56) References Cited

U.S. PATENT DOCUMENTS

| | | |
|---|---|---|
| 2007/0008583 A1 | 1/2007 | Araki |
| 2007/0211691 A1* | 9/2007 | Barber |
| (Continued) | | |

FOREIGN PATENT DOCUMENTS

| | | |
|---|---|---|
| JP | 2015-172824 | 10/2015 |
| JP | 2016-042327 | 3/2016 |
| JP | 2016-218825 | 12/2016 |

OTHER PUBLICATIONS

U.S. Appl. No. 15/873,980, filed Jan. 18, 2018, Ryoji Araki.

*Primary Examiner* — Syed A Roni
(74) *Attorney, Agent, or Firm* — Oblon, McClelland, Maier & Neustadt, L.L.P.

(57) ABSTRACT

An information processing device, an information processing system, and a method of processing an operation request to any one of a plurality of types of apparatuses connected to a network. The information processing device and the method include detecting the plurality of types of apparatuses connected to the network, receiving an operation request that does not depend on the type of the apparatus, directed to any one of the plurality of types of the apparatuses detected in the detecting, and causing the apparatus to execute processing corresponding to the operation request via an interface corresponding to each type of apparatus. The information processing system includes the plurality of types of apparatuses and the information processing device connected to the apparatuses via the network.

14 Claims, 9 Drawing Sheets

(56) References Cited

U.S. PATENT DOCUMENTS

2008/0209569 A1    8/2008   Araki
2011/0041144 A1    2/2011   Araki
2011/0225600 A1    9/2011   Araki
2012/0212779 A1    8/2012   Araki
2012/0216062 A1    8/2012   Araki
2012/0297397 A1   11/2012   Araki
2013/0254903 A1    9/2013   Araki
2014/0149554 A1*   5/2014   Krishna
2014/0229931 A1    8/2014   Araki
2015/0074667 A1    3/2015   Araki
2015/0154573 A1    6/2015   Araki
2015/0264039 A1    9/2015   Fukuda
2015/0264211 A1    9/2015   Araki
2016/0065756 A1    3/2016   Araki et al.
2016/0203033 A1    7/2016   Araki
2016/0205277 A1    7/2016   Araki
2016/0275282 A1    9/2016   Araki
2017/0161048 A1    6/2017   Araki
2017/0293457 A1   10/2017   Araki
2018/0048773 A1    2/2018   Araki

* cited by examiner

INFORMATION PROCESSING DEVICE, INFORMATION PROCESSING SYSTEM, AND INFORMATION PROCESSING METHOD

CROSS-REFERENCE TO RELATED APPLICATION

This patent application is based on and claims priority pursuant to 35 U.S.C. § 119(a) to Japanese Patent Application No. 2017-176524, filed on Sep. 14, 2017, in the Japan Patent Office, the entire disclosure of which is hereby incorporated by reference herein.

BACKGROUND

Technical Field

The present disclosure relates to an information processing device, an information processing system, and a method to simplify the use of a plurality of types of apparatuses.

Background Art

In offices and the like, a variety of apparatuses, such as apparatuses related to image formation such as a printer, a copier, or a multifunction peripheral, and apparatuses supporting communication such as an electronic whiteboard, a video conference system, a projector, a digital signage, and the like are used.

Each apparatus has a unique application program interface (API), in order to enable construction of a solution suitable for the user. Software developers can develop programs to provide the solution to the user by using the API of each apparatus.

SUMMARY

Embodiments of the present disclosure described herein provide an information processing device, an information processing system, and a method to simplify the use of a plurality of types of apparatuses. The information processing device and the method include detecting a plurality of types of apparatuses connected to a network, receiving an operation request that does not depend on the type of the apparatus, for any one of the plurality of types of the apparatuses detected in the detecting, and causing the apparatus to execute processing corresponding to the operation request via an interface corresponding to each type of apparatus. The information processing system includes a plurality of types of apparatuses and an information processing device connected to the apparatuses via a network.

BRIEF DESCRIPTION OF THE DRAWINGS

A more complete appreciation of the disclosure and many of the attendant advantages and features thereof can be readily obtained and understood from the following detailed description with reference to the accompanying drawings.

Figure 1:
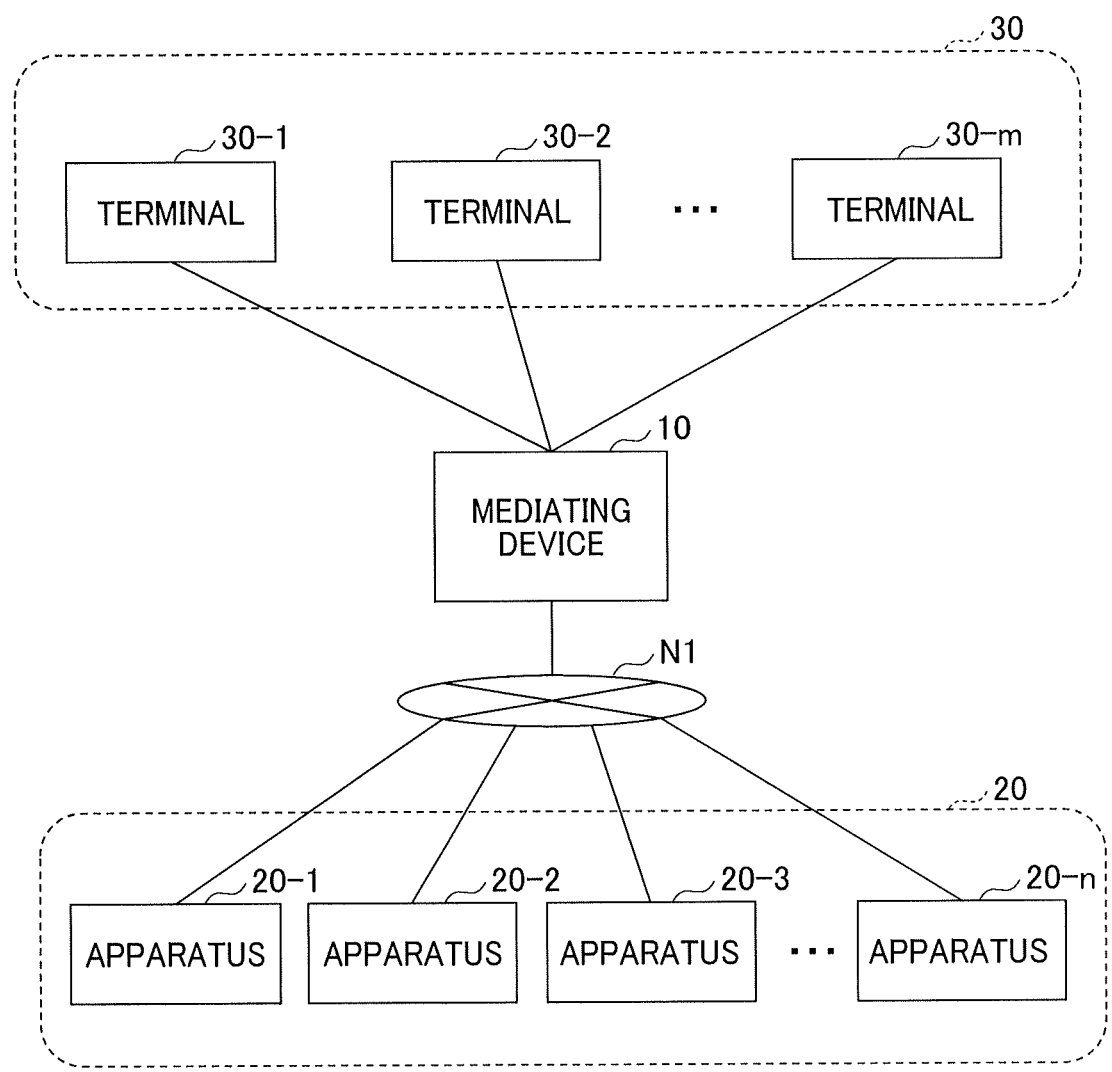
FIG. 1 is a block diagram illustrating a configuration of a system according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

FIG. 1 is a block diagram illustrating a configuration of a system according to a first embodiment of the present disclosure. More specifically, FIG. 1 is a block diagram illustrating an example of a system environment within a corporation (hereinafter referred to as "in-house system").

The in-house system includes a plurality of apparatuses 20-1 to 20-n (hereinafter collectively referred to as "apparatus 20" unless they are to be distinguished from one another), one or more terminals 30-1 to 30-n (hereinafter collectively referred to as "terminal 30" unless they are to be distinguished from one another), and a mediating device 10.

A plurality of apparatuses 20 such as apparatus 20-1 to 20-n is a group of at least two types of apparatuses 20, such as a printer, a copier, a multifunctional peripheral, an electronic whiteboard, a videoconference system, a projector, or a digital signage, connected to a network N1 within the corporation. The apparatus 20 may include a plurality of the same type of apparatus, or all apparatuses 20 may be of different types.

Each type of apparatus 20 has a unique API unique (hereinafter referred to as simply "unique API"), and by calling up the API via the network, the apparatus 20 can be operated. The API of each apparatus 20, for example, may be a web API based on hypertext transfer protocol (HTTP).

On the other hand, one or more terminals 30 such as the terminals 30-1 to 30-*m* are, for example, a smartphone, a tablet terminal, a personal computer (PC), or the like. Alternatively, an operation panel of any of the apparatus 20 may be usable as the terminal 30. In each terminal 30, an application program for operating the apparatus 20 is installed. Each application may be implemented, for example, as a web application operating on a web browser. Note that a smartphone is typically a terminal having multiple functions such as a call function like a mobile phone, an imaging function (i.e., a camera), a web information display function such as a PC, and a tablet terminal is typically a tablet functioning as a multifunction terminal like the smartphone.

The mediating device 10 is a computer that mediates between the APIs unique to each type of the apparatus 20, and provides a common interface independent of the type of the apparatus 20 (hereinafter referred to as "common API") to each terminal 30 (each application). By providing the intermediating device 10, for example, the developer of the application can develop the application by learning the common API. The mediating device 10 can communicate with each terminal 30. Further, the mediating device 10 can communicate with each apparatus 20 via the network N1.

Figure 2:
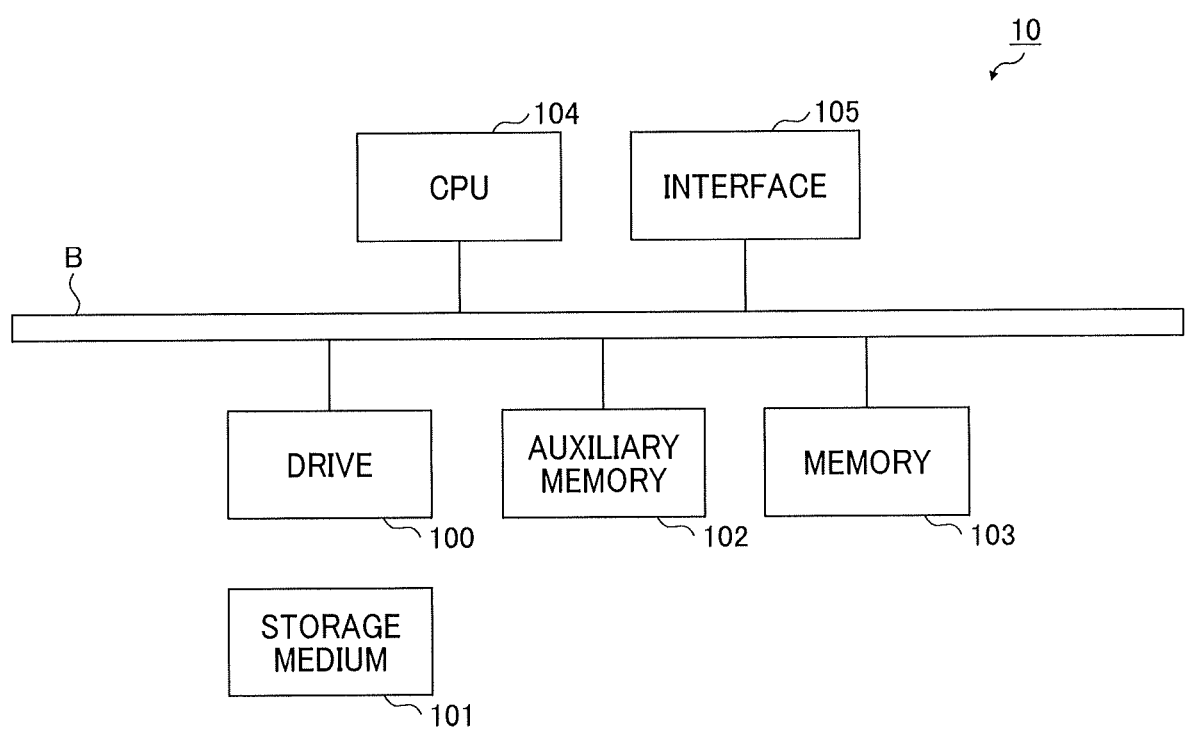
FIG. 2 is a block diagram illustrating a hardware configuration of a mediating device 10 according to the first embodiment of the present disclosure.

FIG. 2 is a block diagram illustrating a hardware configuration of the mediating device 10 according to the first embodiment. The mediating device 10 in FIG. 2 includes a drive 100, an auxiliary memory 102, a memory 103, a central processor unit (CPU) 104, and an interface 105 which are connected to each other through a bus B.

The processing of the mediating device 10 is implemented by a program provided on a storage medium 101 such as a compact disk read-only memory (CD-ROM). After setting the storage medium 101 that stores the program in the drive 100, the program is read from the storage medium 101 and installed in the auxiliary memory 102 via the drive 100. It is not always required to install the program using the storage medium 101, and it is possible to download the program from another computer via the network. The auxiliary memory 102 stores the installed program, necessary files, data and the like.

The memory device 103 reads a program from the auxiliary storage device 102 and stores the program when an instruction to launch the program is issued. The CPU 104 executes the function of the mediating device 10 according to the program stored in the memory 103. The interface 105 is used as an interface for connecting to the network.

Figure 3:
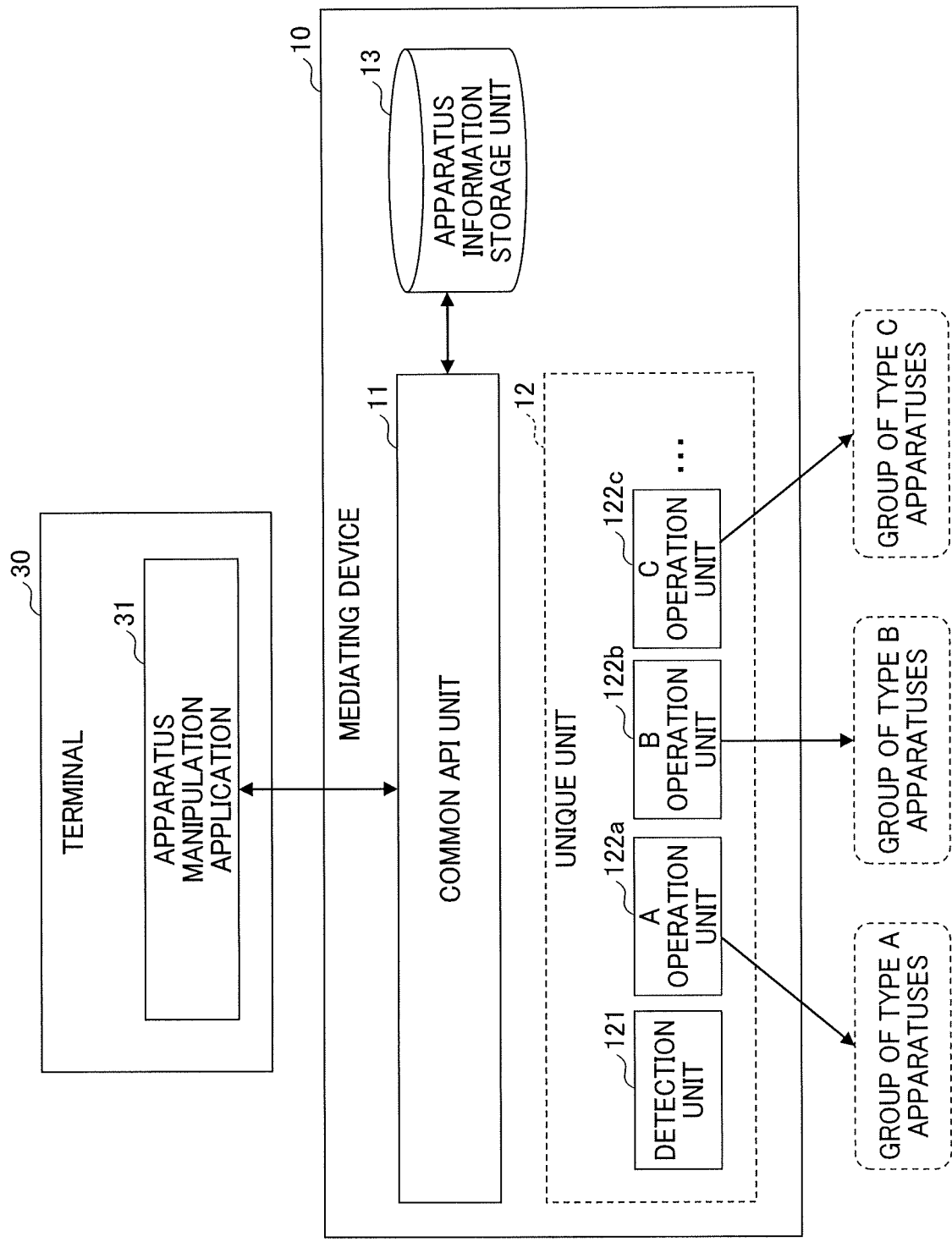
FIG. 3 is a block diagram illustrating a functional configuration of the mediating device 10 according to the first embodiment of the present disclosure.

FIG. 3 is a block diagram illustrating a functional configuration of the mediating device 10 according to the first embodiment of the present disclosure. The mediating device 10 in FIG. 3 includes common API unit 11 and a unique unit 12. These units are implemented by processes that one or more programs installed in the mediating device 10 cause the CPU 104 to execute. The mediating device 10 also uses the apparatus information storage unit 13. The apparatus information storage unit 13 can be implemented by using, for example, the auxiliary memory 102 or a storage device or the like connectable to the mediating device 10 via the network.

The common API unit 11, for example, provides the common API to an apparatus manipulation application 31 which is an example of an application installed in the terminal 30. The common API includes methods or functions (hereinafter collectively referred to as "methods" inclusively) related to the management system of the apparatus 20, methods related to the operation system of the apparatus 20, and the like. An example of the method related to the management system can be a method corresponding to an acquisition request of a list of the apparatus 20 connected to the network N1. Methods related to the operation system of the apparatus 20 include methods corresponding to a job execution request (operation request of the apparatus 20).

However, the functions are different depending on the type of the apparatus 20. For example, in the image forming apparatus, there are functions such as scanning and printing, whereas the electronic whiteboard has no such function. Therefore, when the methods related to the operation are limited to the specific functions of the apparatus 20 such as a scan request or a print request, such method is valid only for the specific type of apparatus 20 and there is a possibility that the common API corresponds one-to-one with the unique API.

Therefore, the functions of each apparatus 20 are shared at an abstracted level and methods of the common API are defined with a common granularity (unit) in this embodiment. For example, an input request and an output request correspond to such a method. In the case of the image forming apparatus, the input request corresponds to the scan request, and in the case of the projector, the electronic whiteboard, the digital signage or the like, the input request corresponds to a read request of data to be processed. Further, in the case of the image forming apparatus, the output request corresponds to the print request, for example, and in the case of the projector, the electronic whiteboard, the digital signage or the like, the output request corresponds to a projection request, a display request, or the like of data to be processed.

The unique unit 12 converts the called common API into the unique API and operates each apparatus 20 using the unique API. The unique unit 12 in FIG. 3 includes a detection unit 121, an A operation unit 122*a*, a B operation unit 122*b*, and a C operation unit 122*c*. The detection unit 121, corresponding to the method of the management system, detects the apparatus 20 connected to the network N1 and acquires apparatus information (for example, management information base (MIB) information) of the detected apparatus 20. The acquired apparatus information is stored in the apparatus information storage unit 13. Since many of the apparatuses 20 are compliant with simple network management protocol (SNMP), the difference in the interface between the apparatuses 20 is small with regard to the acquisition of the apparatus information. However, depending on the type of the apparatus 20, the configuration of the private MIB may be different. The detection unit 121 stores the apparatus information in which the difference in the configuration of the MIB is absorbed in the apparatus information storage unit 13.

The A operation unit 122*a* controls a group of type A apparatuses 20 (for example, the multifunction peripheral) via the unique API for type A apparatus 20. The B operation unit 122*b* controls a group of type B apparatuses 20 (for example, the electronic whiteboard) via the unique API for type B apparatus 20. The C operation unit 122*c* controls a group of type C apparatuses 20 (for example, the projector) via the unique API for type C apparatus 20.

In other words, the role of operating the apparatus 20 via the unique API for the apparatus 20 is common to the A operation unit 122 *a*, the B operation unit 122 *b*, and the C operation unit 122 *c* (hereinafter collectively referred to as "operation unit 122" unless they are to be distinguished from one another). However, the types of apparatuses 20 that can be handled differ. Note that the operation unit 122 corresponding to another type of apparatus 20 may be provided. In order to facilitate expansion and contraction of the unique unit 12, the detection unit 121 and the operation unit 122 may be configured as a plug-in for the common API unit 11.

Figure 4:
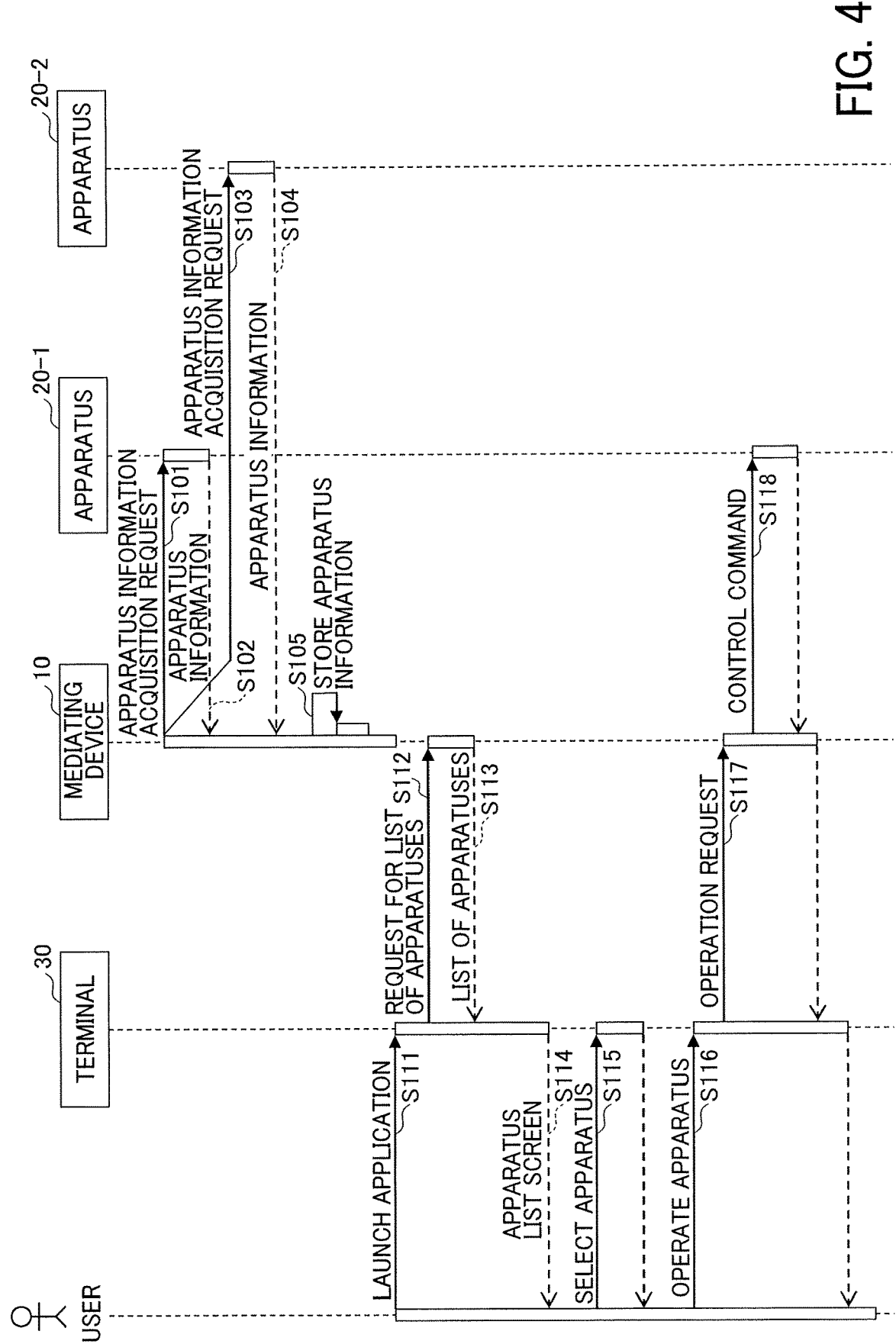
FIG. 4 is a sequence diagram illustrating a Processes of the mediating device 10 according to the first embodiment of the present disclosure.

Processes executed by the mediating device 10 are described below. FIG. 4 is a sequence diagram illustrating the processes executed by the mediating device 10 in the first embodiment.

For example, at activation of the mediating device 10 or at a fixed time interval, the detection unit 121 transmits an apparatus information acquisition request to each apparatus 20 connected to the network N1 (steps S101, and S103) and receives the apparatus information from each apparatus 20 (steps S102, and S104). Note that for convenience sake, FIG. 4 illustrates an example where the apparatus information is acquired from the two apparatuses 20, but the apparatus information is acquired from every apparatus 20 connected to the network N1.

The apparatus information acquisition request may be transmitted, for example, by broadcasting to a predetermined network address. For the apparatus 20 having an internet protocol (IP) address outside the predetermined network address range, the IP address may be registered in advance and the apparatus information acquisition request may be transmitted by unicast for the IP address. The SNMP may be used to acquire the apparatus information and the MIB information may be acquired as the apparatus information. When the object identifier (OID) is different for each type of the apparatus 20, the detection unit 121 designates an OID corresponding to the type of the apparatus 20 and acquires the apparatus information corresponding to the OID. The correspondence between the type of the apparatus 20 and the OID may be incorporated as logic of the detection unit 121 or may be stored in the auxiliary memory 102 or the like. For example, information including items (parameters) such as a media access control (MAC) address, an IP address, a host name, a device name, type and state of the apparatus 20, and the like is acquired as the apparatus information. The detection unit 121 stores the acquired apparatus information in the apparatus information storage unit 13.

Thereafter, when the apparatus manipulation application 31 is launched in the terminal 30 at an arbitrary timing of the user of the terminal 30 (step S111), the apparatus manipulation application 31 calls up the apparatus list acquisition method of the common API unit 11 of the mediating device 10, and a request to acquire the apparatus list is transmitted to the common API unit 11 (step S112). Subsequently, the common API unit 11 returns a list of the apparatus information stored in the apparatus information storage unit 13 to the apparatus manipulation application 31 (step S113) as a response to the method. The list of apparatuses is an example of a list in which the apparatus 20 related to each apparatus information can be selected. Note that the list of apparatuses may be acquired from each apparatus 20 in response to the invocation of the method. Upon receiving the list of apparatuses, the apparatus manipulation application 31 displays the apparatus list screen based on the list of apparatuses (step S114).

Figure 5:
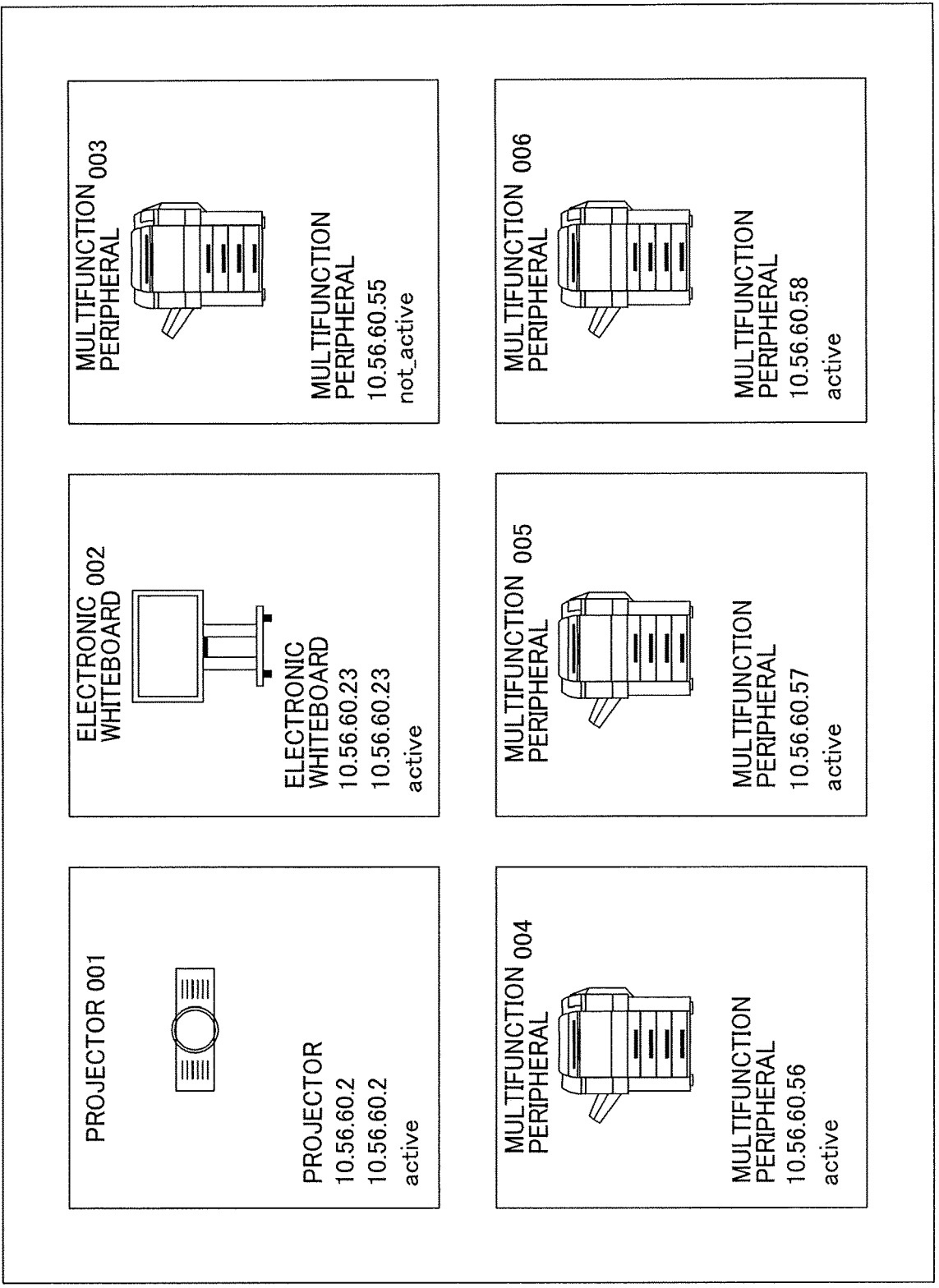
FIG. 5 is a diagram illustrating an apparatus list screen according to embodiments of the present disclosure.

FIG. 5 is a diagram illustrating the apparatus list screen according to the present embodiment. In FIG. 5, information of each apparatus included in the apparatus list is displayed in a tile format on the apparatus list screen 510. In each tile, an icon corresponding to the type of the apparatus 20, some items included in the apparatus information, and the like are displayed. Therefore, the user can confirm the information of various types of apparatuses 20 on one apparatus list screen 510. The format of the apparatus list screen 510 is merely one example. Alternatively, for example, a list of apparatuses information may be displayed in a table format.

In the step S115, when any tile on the apparatus list screen 510 is selected by the user, the tile turns to a selected state. In this state, the detailed information of the selected apparatus 20 may be displayed when instructed from a context menu or a pull-down menu.

Figure 6:
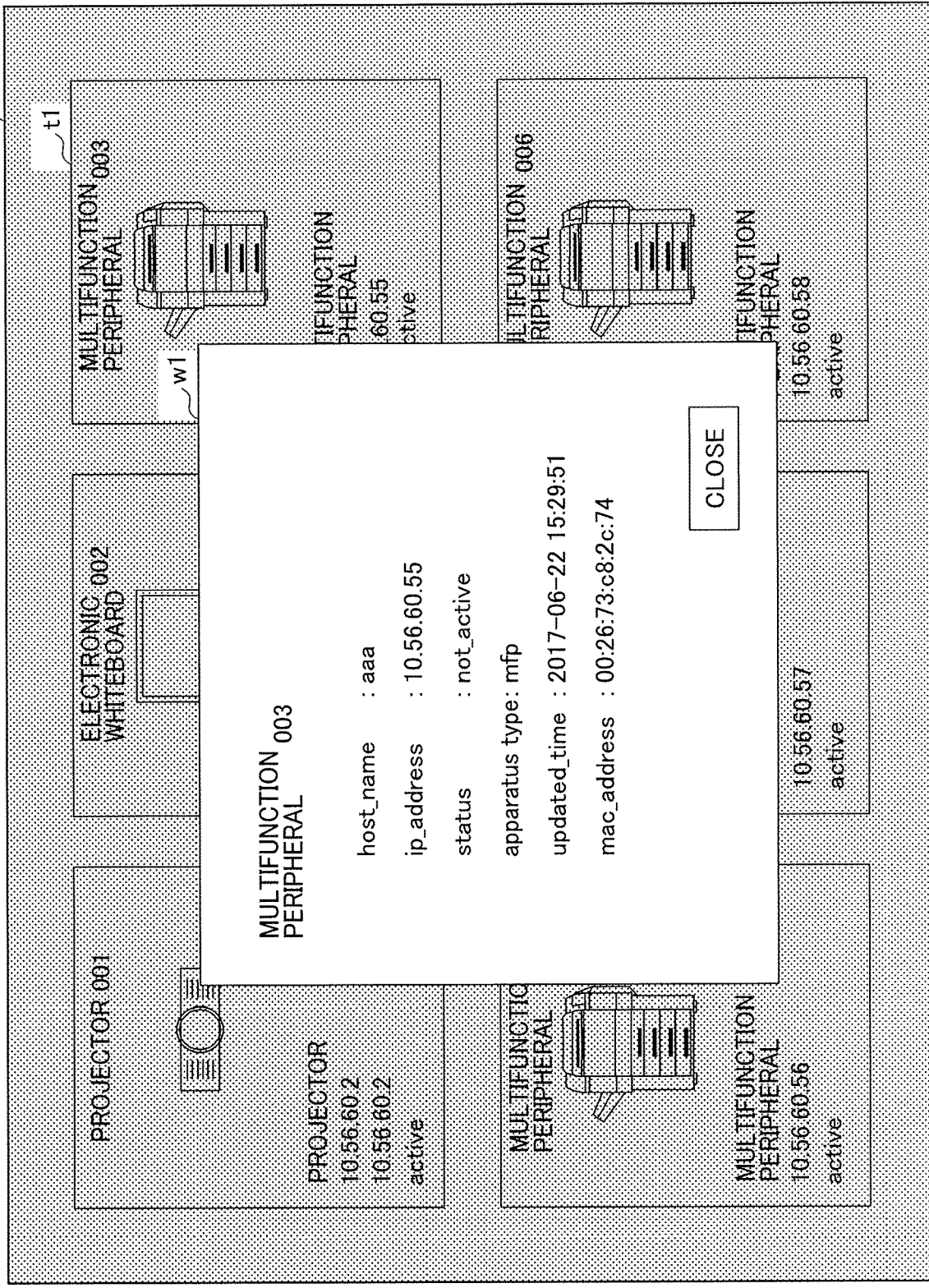
FIG. 6 is a diagram illustrating a display example of details of apparatus information, according to embodiments of the present disclosure.

FIG. 6 is a diagram illustrating a display example of the details of the apparatus information, according to the present embodiment. FIG. 6 illustrates an example in which the details of the apparatus information of the apparatus 20 corresponding to the tile t1 is displayed in the pop-up window w1. Note that the details of the apparatus information are, for example, the apparatus information including items not displayed in the tile.

When one of the tiles is selected, for example, when the user instructs the operation of the apparatus 20 via the context menu or the pull-down menu (step S116), the apparatus manipulation application 31 transmits the operation request to the common API unit 11 (step S117) by calling up the corresponding method from the common API unit 11 of the mediating device 10. The operation request includes identification information (hereinafter referred to as "apparatus ID") of the apparatus 20 (that is, the operation target apparatus 20) included in the apparatus information corresponding to the selected tile. For example, the MAC address, the IP address, or the like may be used as the apparatus ID.

The user-selectable operation is an operation abstracted to a plurality of types of apparatuses 20, such as input, output, or the like, similar to the method of the common API unit 11.

In response to the operation request, the common API unit 11 specifies the type of the apparatus 20 corresponding to the apparatus ID included in the operation request. The type of the apparatus 20 can be specified by referring to the apparatus information corresponding to the apparatus ID among the apparatus information stored in the apparatus information storage unit 13. The common API unit 11 inputs the operation request to the operation unit 122 corresponding to the specified apparatus type. For example, if the specified apparatus type is type A, the operation request is input to the A operation unit 122*a*.

Subsequently, the A operation unit 122*a* transmits a control command for executing an operation corresponding to the operation request to the apparatus 20 associated with the apparatus ID included in the operation request (step S118). The control command is transmitted via the unique API corresponding to the type of the apparatus 20. Upon receiving the control command, the apparatus 20 executes a process corresponding to the control command. As a result, the apparatus manipulation application 31 can operate the apparatus 20 without directly calling up the unique API for the apparatus 20.

As described above, according to the first embodiment, the apparatus manipulation application 31 can operate various apparatuses 20 via the common API independent of the type of the apparatus 20. Therefore, it is possible to simplify the use of a plurality of types of apparatus 20.

Hereinafter, a description is given of a second embodiment of the present disclosure. In the second embodiment, those points that are different from the first embodiment are emphasized. In other words, points omitted below may be the same as those of the first embodiment.

Figure 7:
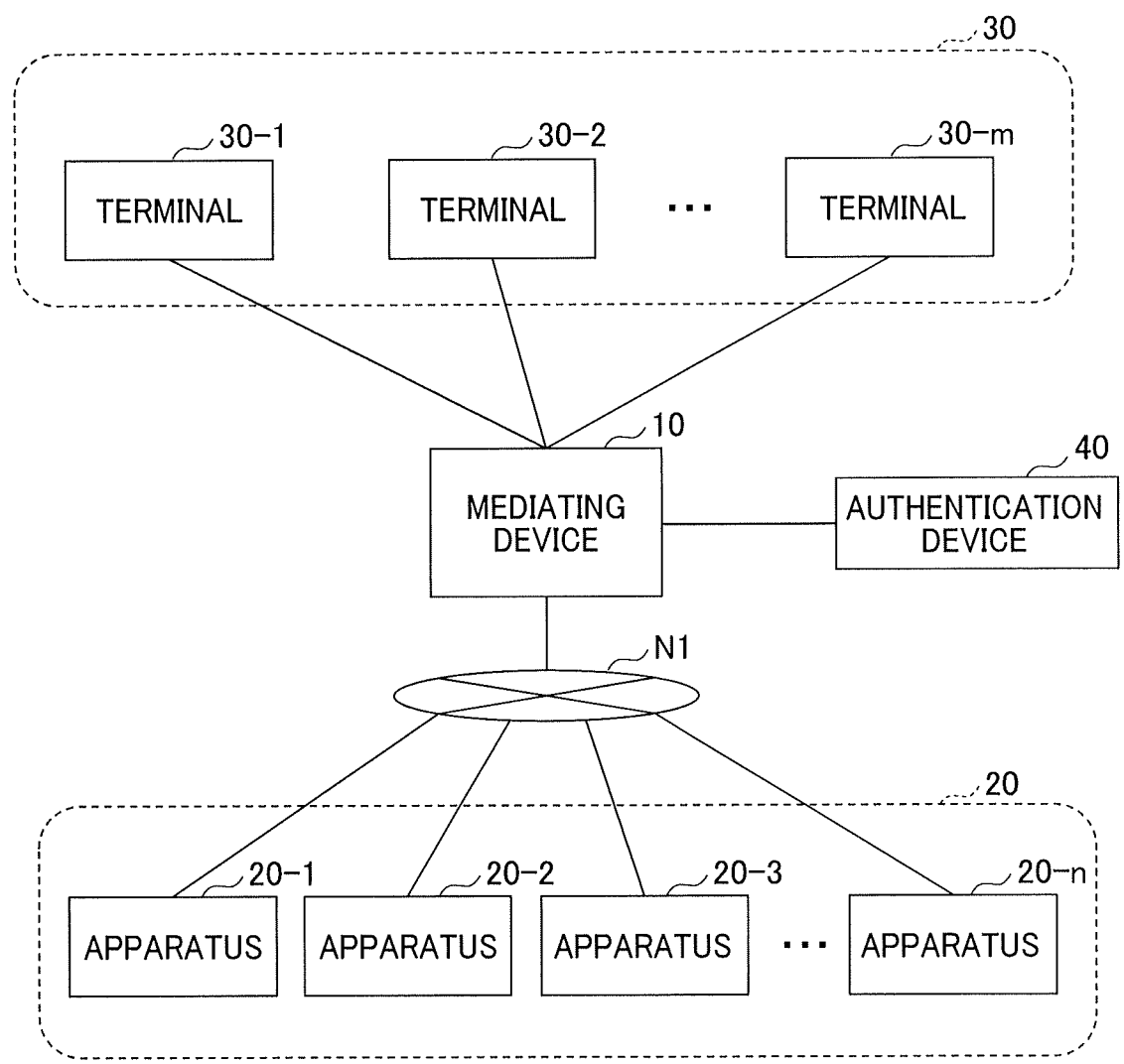
FIG. 7 is a block diagram illustrating a configuration of a system according to a second embodiment of the present disclosure.

FIG. 7 is a diagram illustrating a configuration of a system according to the second embodiment of the present disclosure. In FIG. 7, the same reference numbers are allocated to the same functional units as those of FIG. 1, and redundant descriptions thereof are omitted.

In FIG. 7, an authentication device 40 is added that can further communicate with the mediating device 10 via the network. The authentication device 40 may be connected to the network N1 or may be capable of communicating with the mediating device 10, for example, via the internet or the like.

The authentication device 40 is a computer that executes authentication for a user who operates any of the apparatuses 20 among the users of the terminal 30. Note that any of the apparatuses 20 may be used as the authentication device 40.

Figure 8:
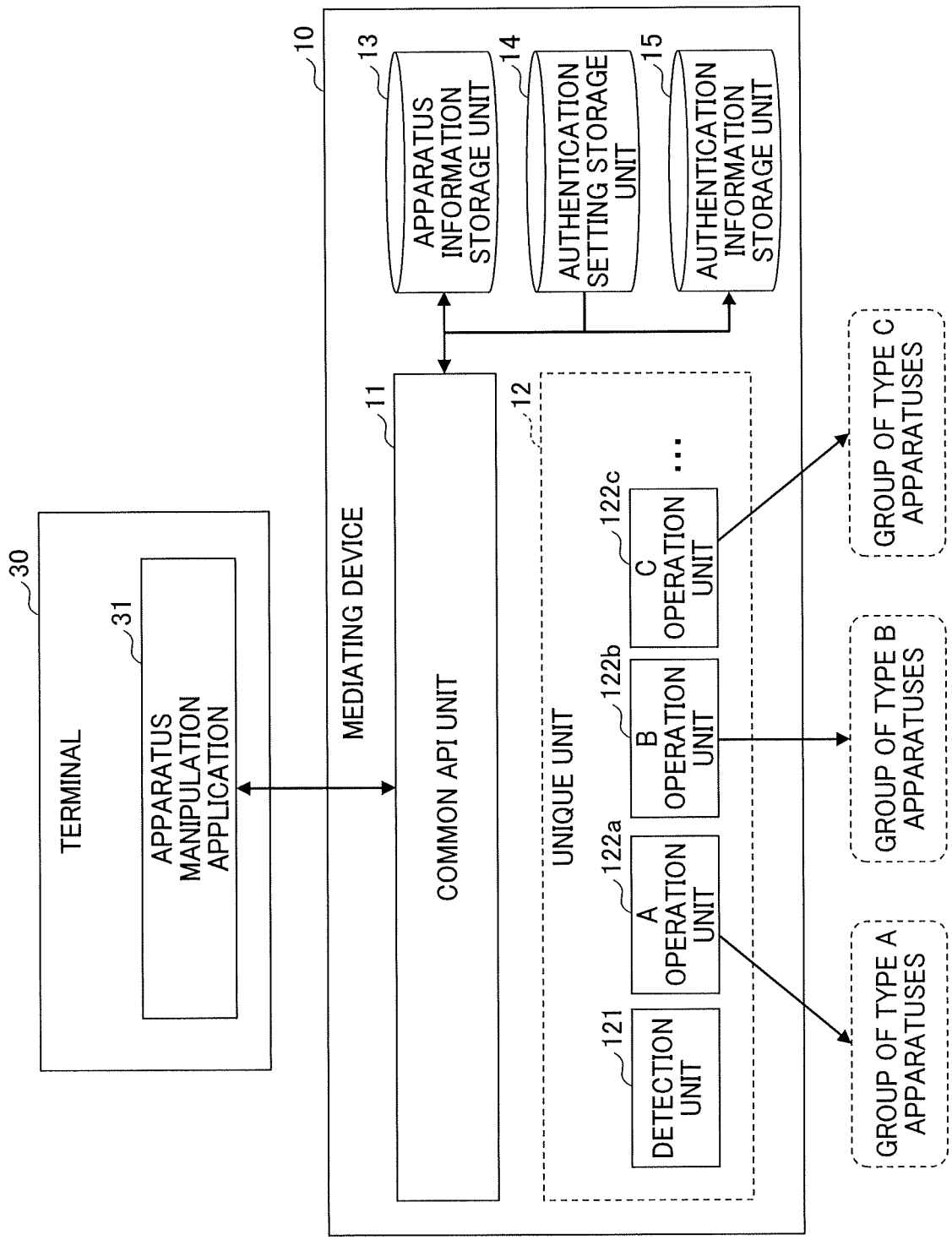
FIG. 8 is a block diagram illustrating a functional configuration of a mediating device 10 according to the second embodiment of the present disclosure.

FIG. 8 is a block diagram illustrating the functional configuration of the mediating device 10 according to the second embodiment. In FIG. 8, the same reference numbers are allocated to the same functional units as those of FIG. 3, and redundant descriptions thereof are omitted below. In FIG. 8, the mediating device 10 further uses the authentication setting storage unit 14 and the authentication information storage unit 15. Each of these storage units can be implemented by using, for example, the auxiliary memory 102 or a storage device or the like connectable to the mediating device 10 via the network.

In the authentication setting storage unit 14, information indicating whether or not the user is required to be authenticated (hereinafter referred to as "authentication setting") is stored. The authentication setting may be common to all the terminals 30 or may be settable for each terminal 30.

In the authentication information storage unit 15, the authentication information of the authenticated user is stored in association with the IP address of the user's terminal 30 and the apparatus ID of the operation target apparatus 20. The authentication information stored in the authentication information storage unit 15 may be authentication information (user ID, password, and the like) input by the user, or may be processed data of the authentication information input by the user (for example, an encrypted value, a hash value, or the like).

Figure 9:
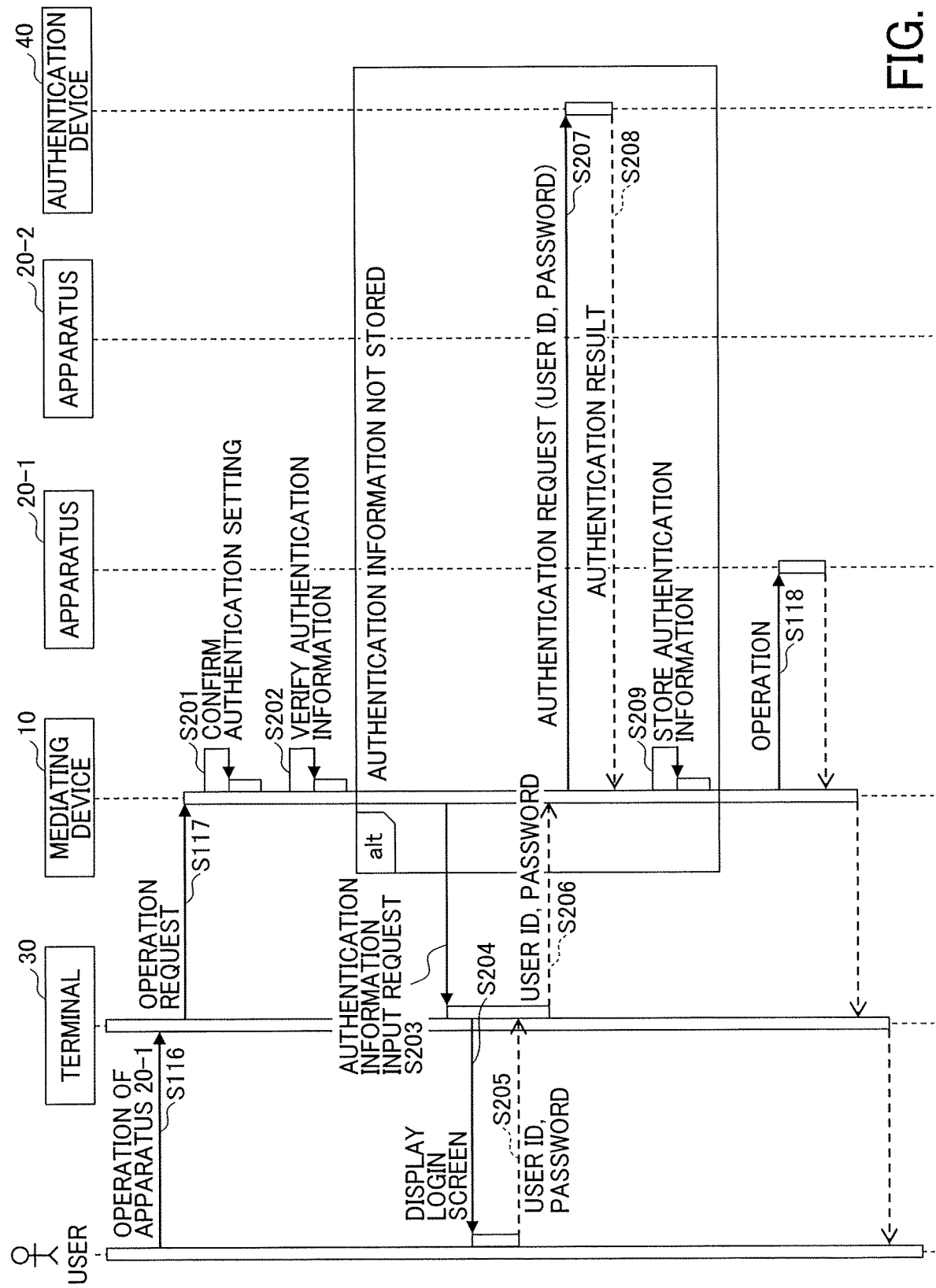
FIG. 9 is a sequence diagram illustrating a process of a mediating device 10 according to the second embodiment of the present disclosure.

FIG. 9 is a sequence diagram illustrating processing executed by the mediating device 10 according to the second embodiment. In FIG. 9, it is assumed that steps S101 to S115 in FIG. 4 have already been executed. Further, in FIG. 9, the same step numbers as those in FIG. 4 are assigned to the same steps, and description thereof is omitted.

In response to the operation request, the common API unit 11 confirms the authentication setting stored in the authentication setting storage unit 14 (step S201). When the authentication setting is stored for each terminal 30, the common API unit 11 confirms the authentication setting corresponding to the IP address (hereinafter referred to as "transmission source address") of the request source terminal of the operation request. When the authentication setting indicates that authentication is unnecessary, steps S202 to S209 are not executed but step S118 is executed.

When the authentication setting indicates that authentication is necessary, the common API unit 11 determines whether authentication information associating the apparatus ID included in the received operation request (hereinafter referred to as "target apparatus ID") and the transmission source address is stored in the authentication information storage unit 15 (presence or absence of authentication information) (step S202).

When the corresponding authentication information is not stored in the authentication information storage unit 15, step S118 is executed after steps S203 to S209 are executed.

In step S203, the common API unit 11 returns an authentication information input request to the apparatus manipulation application 31. When the apparatus manipulation application 31 is a web application and HTTP is used, the response may be 401 Unauthorized.

The apparatus manipulation application 31 displays a login screen in response to the authentication information input request (step S204). When the user inputs authentication information (user ID and password) to the login screen (step S205), the apparatus manipulation application 31 transmits the authentication information to the common API unit 11 (step S206).

The common API unit 11 transmits an authentication request including the authentication information to the authentication device 40 set in advance as an authentication request destination (step S207). The authentication device 40 verifies the authentication information against the list of correct authentication information (user ID and password), and returns the authentication result (step S208). If the authentication result indicates authentication failure, the subsequent processing is aborted. Alternatively, step S203 may be repeated and the login screen may be displayed again.

When the authentication result indicates the success of the authentication, the common API unit 11 associates the authentication information that succeeded in the authentication (that is, the authentication information received in step S206) with the transmission source address and the target apparatus ID and stores the information in the authentication information unit 15 (step S209).

On the other hand, in step S202, when the corresponding authentication information is stored in the authentication information storage unit 15, the common API unit 11 does not request the input of the authentication information. More specifically, steps S203 to S209 are not executed and step S118 is executed. Therefore, single sign-on is realized for various operation requests to the same apparatus 20 from the same terminal 30.

Note that a predetermined period may be set as an expiration date of the authentication information stored in the authentication information storage unit 15. When the expiration date has expired, steps S203 to S209 may be executed.

Also, only the source address may be stored in association with the authentication information in step S209. In this case, in step S202, the presence or absence of authentication information associated with the transmission source address may be determined. By doing so, it is possible to realize single sign-on for an operation request to a plurality of apparatuses 20. In other words, if the authentication is successful for the operation request to any one of the apparatuses 20, it is possible to avoid requesting authentication in response to the operation request directed to another apparatus 20 thereafter.

As described above, according to the second embodiment, the mediating device 10 can perform authentication for the operation of the apparatus 20 on behalf of the apparatus 20. Therefore, for example, it is possible to reduce the necessity for the developer of the apparatus manipulation application 31 to consider the difference in the login method of each apparatus 20.

The functional units of the mediating device 10 as illustrated in FIG. 3 and FIG. 8 may be included in each terminal 30. In other words, each terminal 30 may include the mediating device 10.

In each of the above embodiments, the mediating device 10 or the terminal 30 is an example of the information processing device. The terminal 30 or the apparatus manipulation application 31 is an example of the source of the operation request. The transmission source address is an example of the first identification information. The apparatus ID is an example of the second identification information. The authentication information storage unit 15 is an example of the storage unit. The common API unit 11 is an example of an authentication request unit, an output unit, and an identification unit.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

What is claimed is:

1. An information processing device, comprising:
processing circuitry configured to
detect a plurality of types of apparatuses connected to a network;
receive, from an application executing in a terminal, an operation request defined by a common application programming interface (API), the operation request including information of an abstracted operation that does not depend on a type of an apparatus and includes an identifier of a specific apparatus of a specific type, of the plurality of types of the apparatuses detected, on which the abstracted operation is to be executed;
determine a specific API based on the specific type of the specific apparatus corresponding to the identifier; and
transmit, to the specific apparatus, a control command defined by the determined specific API to cause the specific apparatus to execute processing corresponding to the abstracted operation, such that the application operates the specific apparatus without directly calling the specific API of the specific apparatus.

2. The information processing device of claim 1, wherein, in response to receiving the operation request directed to the specific apparatus, the processing circuitry is further configured to
request input of authentication information to a request source terminal of the operation request,
request authentication of the input authentication information to an authentication device connected via the network, and
when authentication of the authentication information is successful, cause the specific apparatus to execute a process corresponding to the received operation request.

3. The information processing device of claim 2, wherein when the authentication of the authentication information is successful, the processing circuitry is further configured to store, in a memory, the authentication information and first identification information identifying the request source terminal of the operation request, in association with second identification information identifying the specific apparatus of the received operation request; and
when receiving the operation request from the request source terminal related to the first identification information stored in association with the authentication information in the memory, the operation request for the specific apparatus related to the second identification information stored in the memory in association with the authentication information, the processing circuitry is further configured to not request input of authentication information to the request source terminal.

4. The information processing device of claim 2, wherein when the authentication of the authentication information is successful, the processing circuitry is further configured to store, in a memory, the authentication information and first identification information identifying the request source terminal of the operation request in association with each other; and
when the operation request directed to the specific apparatus is received from the request source terminal related to the first identification information stored in association with the authentication information in the memory, the processing circuitry is further configured to not request input of authentication information to the request source terminal.

5. The information processing device of claim 1, wherein the processing circuitry is further configured to output an apparatus list from which the specific apparatus can be selected from the plurality of types of apparatuses detected.

6. The information processing device of claim 5, wherein the processing circuitry is further configured to determine the type of the specific apparatus corresponding to the identifier of the specific apparatus included in the operation request for the specific apparatus selected from the apparatus list.

7. The information processing device of claim 1, wherein the processing circuitry is further configured to determine the specific type of the specific apparatus from the identifier, and determine the specific API that corresponds to the specific type of apparatus, wherein each specific type of apparatus has a corresponding different API.

8. An information processing system, comprising:
a plurality of types of apparatuses, each type of apparatus having an application programming interface (API) unique to the type of apparatus; and
an information processing device connected to the plurality of types of apparatuses via a network, wherein the information processing device comprises circuitry configured to
detect an apparatus connected to the network,
receive, from an application executing in a terminal, an operation request defined by a common application programming interface (API), the operation request including an identifier of a specific apparatus of a specific type, of the plurality of types of the apparatuses detected, on which an abstracted operation is to be executed, and includes information of the abstracted operation, which does not depend on a type of an apparatus,
determine a specific API based on the specific type of the specific apparatus corresponding to the identifier, and
transmit, to the specific apparatus, a control command defined by the determined specific API to cause the specific apparatus to perform processing corresponding to the abstracted operation, such that the application operates the specific apparatus without directly calling the specific API of the specific apparatus.

9. A method, comprising:

detecting a plurality of types of apparatuses connected to a network;

receiving, from an application executing in a terminal, an operation request defined by a common application programming interface (API), the operation request including an abstracted operation that does not depend on a type of an apparatus and includes an identifier of a specific apparatus of a specific type, of the plurality of types of the apparatuses detected in the detecting step, on which the abstracted operation is to be executed;

determining a specific API based on the specific type of the specific apparatus corresponding to the identifier; and transmitting, to the specific apparatus, a control command defined by the determined specific API to cause the specific apparatus to execute processing corresponding to the abstracted operation, such that the application operates the specific apparatus without directly calling the specific API of the specific apparatus.

10. The method of claim 9, wherein, in response to the operation request directed to the specific apparatus, the method further comprises:

requesting input of authentication information to a request source terminal of the operation request;

requesting authentication of the input authentication information to an authentication device connected via the network; and when the authentication of the authentication information is successful, causing the specific apparatus to execute a process corresponding to the received operation request.

11. The method of claim 10, the method further comprising:

when the authentication of the authentication information is successful, storing, in a memory, the authentication information and first identification information identifying the request source terminal of the operation request, in association with second identification information identifying the specific apparatus of the received operation request; and upon receiving the operation request for the specific apparatus related to the second identification information stored in the memory in association with the authentication information from the request source terminal related to the first identification information stored in association with the authentication information in the memory, not requesting input of the authentication information to the request source terminal.

12. The method of claim 10, the method further comprising:

when the authentication of the authentication information is successful, storing, in a memory, the authentication information and first identification information identifying the request source terminal of the received operation request in association with each other, and upon receiving the operation request directed to the specific apparatus from the request source terminal related to the first identification information stored in association with the authentication information in the memory, not requesting input of the authentication information to the request source terminal.

13. The method of claim 9, further comprising outputting an apparatus list in which the specific apparatus can be selected from the plurality of types of apparatuses detected in the detecting step.

14. The method of claim 13, further comprising determining the type of the specific apparatus corresponding to the identifier of the specific apparatus included in the operation request for the specific apparatus selected from the list.

* * * * *